US 6,714,525 B1

(12) United States Patent
Mansour

(10) Patent No.: US 6,714,525 B1
(45) Date of Patent: *Mar. 30, 2004

(54) CELLULAR/PCS CDMA SYSTEM WITH INCREASED SECTOR CAPACITY BY USING TWO RADIO FREQUENCIES

(75) Inventor: Nagi A. Mansour, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,422

(22) Filed: Jan. 27, 2000

Related U.S. Application Data

(63) Continuation-in-part of application No. 09/250,646, filed on Feb. 16, 1999.

(51) Int. Cl.[7] ............................................. H04B 7/216
(52) U.S. Cl. ........................ 370/335; 370/342; 455/102; 455/103
(58) Field of Search ........................ 370/335, 341–342, 370/328–329, 334, 441; 455/432–433, 450–452, 15, 101–103, 561, 562

(56) References Cited

U.S. PATENT DOCUMENTS

| | | | |
|---|---|---|---|
| 4,191,860 A | | 3/1980 | Weber |
| 5,247,571 A | | 9/1993 | Kay et al. |
| 5,303,285 A | | 4/1994 | Kerihuel et al. |
| 5,353,331 A | | 10/1994 | Emery et al. |
| 5,694,463 A | | 12/1997 | Christie et al. |
| 6,005,516 A | * | 12/1999 | Reudink et al. ............ 342/375 |
| 6,097,336 A | * | 8/2000 | Stilp ..................... 342/357.02 |
| 6,188,911 B1 | * | 2/2001 | Wallentin et al. .......... 455/524 |
| 6,195,046 B1 | * | 2/2001 | Gilhousen .................. 342/457 |
| 6,320,898 B1 | * | 11/2001 | Newson et al. ............. 375/144 |
| 6,411,825 B1 | * | 6/2002 | Csapo et al. ................ 455/561 |
| 6,483,823 B1 | * | 11/2002 | Mansour .................... 370/330 |
| 6,510,172 B1 | * | 1/2003 | Miller ........................ 375/140 |

* cited by examiner

Primary Examiner—Chi Pham
Assistant Examiner—Thai D Hoang

(57) ABSTRACT

A CDMA PCS telecommunications cell (40) of increased capacity includes a plurality of sectors (42, 44, 46) controlled by a base station (14) using a defined set of CDMA codes for each sector. Capacity is increased by configuring the base station to operate at two different, non-interfering frequencies within each sector of the cell.

11 Claims, 1 Drawing Sheet

CELLULAR/PCS CDMA SYSTEM WITH INCREASED SECTOR CAPACITY BY USING TWO RADIO FREQUENCIES

RELATED APPLICATIONS

This application is a continuation-in-part of application Ser. No. 09/250,646 filed Feb. 16, 1999.

BACKGROUND OF THE INVENTION

1. Field of the Invention

The present invention relates to the field of digital cellular wireless telecommunications. More particularly, the invention relates to a telecommunications cell for a digital CDMA, wireless telecommunications network.

2. Description of the Prior Art

Sprint PCS and other companies offer wireless communication services using code division multiple access (CDMA) techniques. CDMA is a digital spread-spectrum modulation technique that digitizes wireless conversations and tags them with special codes. The digitized data is spread across the frequency band in a pseudo random pattern. Receiving mobile phones are instructed to decipher only the data corresponding to particular codes to reconstruct the signal. CDMA networks are superior to other wireless networks because they provide increased network capacity, fewer dropped calls because of better hand-off methods, improved voice clarity, improved privacy and transmission security, and enhanced services such as text messaging and data transmissions.

A typical CDMA PCS telecommunications cell includes a base station unit and three sector antennas that together provide wireless communications in three sectors of the cell each covering 120°. The base station unit uses a predefined set of sixty-four CDMA Walsh codes for each sector, with one of the codes used for pilot channel, another for synchronization, one commonly used for paging, and the remainder available for ordinary traffic.

In actual usage, however, all of the remaining channels cannot be used for traffic because of noise accumulated in the band due to a variety of reasons such as interference from adjacent cells and unused multi-path signals. With the distinct advantages of PCS CDMA communications, demand for service is substantial and in some cases, may exceed cell capacity. In the prior art, one of the solutions has been to add more base stations at the same cells to provide increased capacity. This is an expensive solution because it requires additional base stations and equipment.

SUMMARY OF THE INVENTION

The present invention solves the prior art problems discussed above and provides a distinct advance in the state of the art. In particular, the system hereof provides an improved telecommunications cell for a PCS CDMA telecommunications network.

The preferred cell includes a single base station unit and a plurality of antennas that configure the cell into a plurality of sectors. The base station controls transmission and reception over the antennas using selected ones of a defined set of CDMA codes for each of the sectors. Each sector preferably includes two antennas coupled with the base station. The base station is configured to divide the number of available Walsh codes or channels for each sector so that each antenna in each sector operates at a separate frequency and handles a portion of the Walsh codes or channels for the sector. This provides two transmission frequencies in each sector with a single base station, thereby increasing effective cell capacity by a factor of two without increasing the number of base stations.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT

Figure 1:
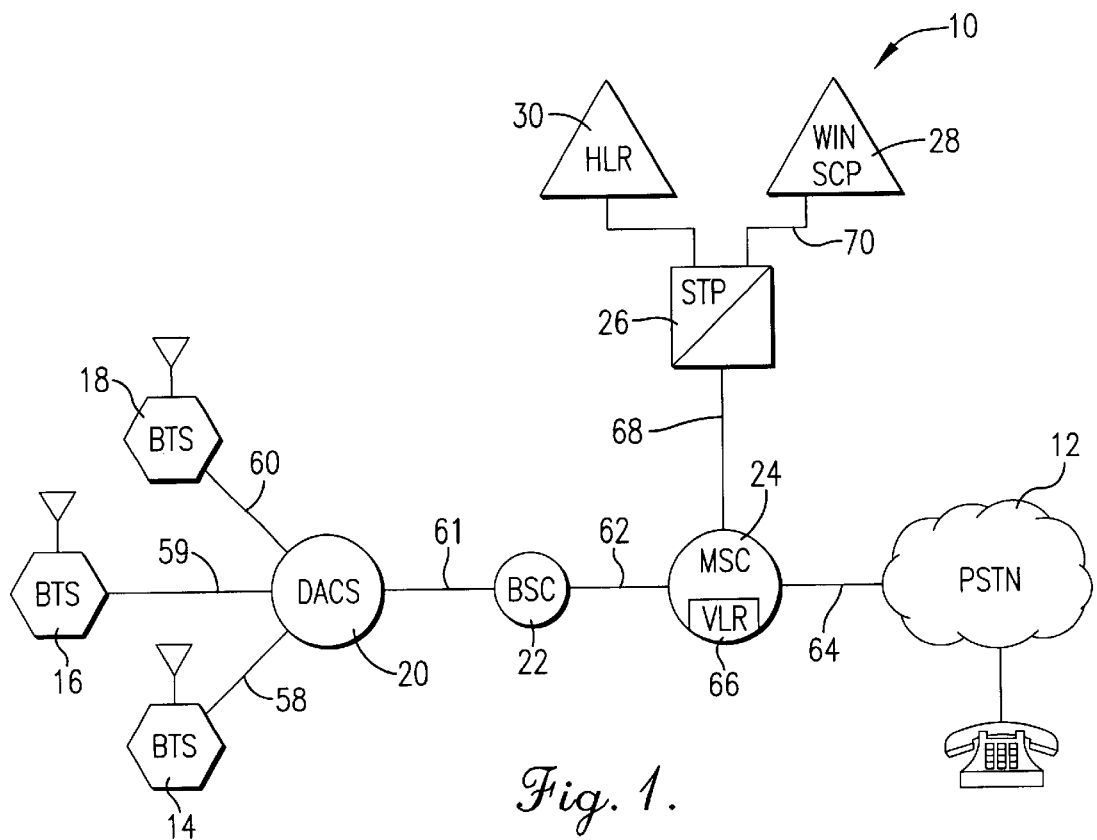
FIG. 1 is a schematic diagram broadly illustrating a CDMA wireless network configured in accordance with a preferred embodiment of the present invention.

Turning now to the drawing figures, an example of a wireless telecommunications network 10 that may be used to implement a preferred embodiment of the present invention is illustrated. The illustrated architecture is shown for purposes of disclosing a preferred embodiment and can be modified as a matter of design choice. The wireless network is preferably a code division multiple access (CDMA) PCS wireless network such as the PCS network owned and operated by Sprint PCS. The wireless network is coupled with a public switched telephone network (PSTN) 12; which is used herein to refer to the entire local, long distance, and international landline phone system used in the United States, which includes well known components such as central office local exchange carriers (LECs) and interexchange carriers (IXCs).

The wireless network 10 broadly includes a plurality of base stations (BTSs) 14, 16, 18, a digital access and cross-connect system (DACS) 20, a base station controller (BSC) 22, a mobile switching center (MSC) 24, a signal transfer point (STP) 26, a wireless intelligent network service control point (WIN SCP) 28, and a home location register (HLR) 30, all interconnected by signaling data links and trunk circuits as described below.

Figure 2:
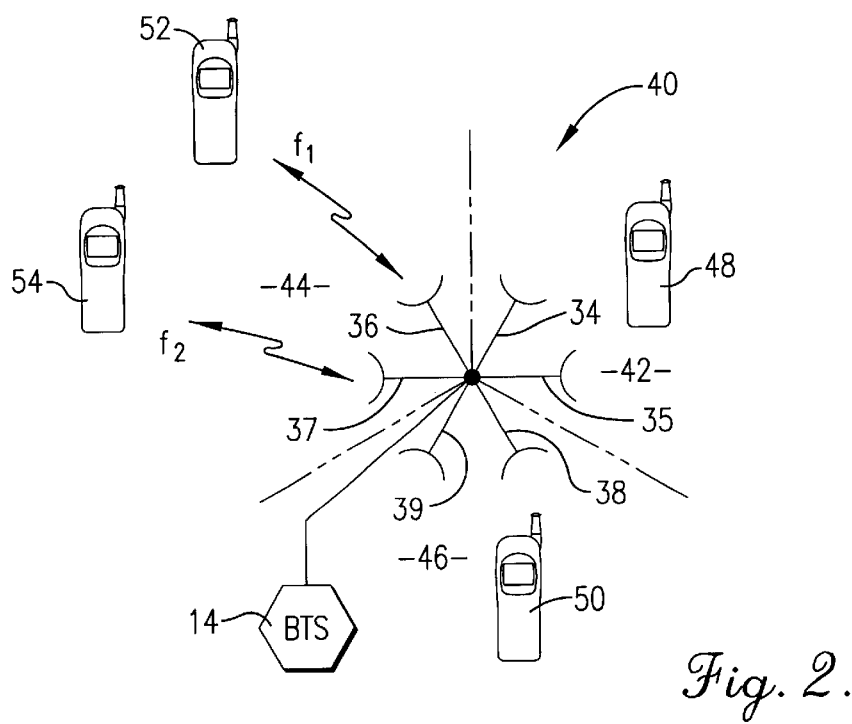
FIG. 2 is a schematic diagram of a base station of the wireless network.

The BTSs 14, 16, 18 each provide wireless communications in a telecommunications cell to mobile phones 48, 50, 52, 54 and other wireless devices present in the cell. FIG. 2 illustrates one of the BTSs 14 in more detail. The BTS includes a plurality of transceivers that are coupled with a plurality of antennas 34, 35, 36, 37, 38, 39. The BTS and antennas provide wireless communications in a cell 40 and are configured to subdivide the cell into three sectors 42, 44, 46, each spanning 120°. Two of the antennas are positioned in each sector of the cell. Specifically, the sector 42 includes antennas 34 and 35; the sector 44 includes antennas 36 and 37; and the sector 46 includes antennas 38 and 39.

The BTS 14 is operable to control transmission and reception of CDMA PCS traffic in the cell 40 using selected ones of a defined set of codes for each sector 42, 44, 46. The codes may include, for example, 64 Walsh codes for each sector. In accordance with one aspect of the present invention, the BTS is configured to divide the 64 available Walsh codes for each sector of its cell between two RF frequencies (f1, f2) in the sector. For example, the BTS may operate at a first frequency f1 (e.g., 1931.25 MHZ) then for more capacity, it will be programmed to operate at a second frequency f2 (e.g., 1933.75 MHZ). The mobile stations 48, 50, 52, 54 are programmed to scan between frequencies f1 and f2 and to lock onto the strongest pilot channel. The configuration of a base station to operate two frequencies effectively doubles the capacity of each sector and therefore doubles the capacity of the overall cell.

To increase the capacity of the system, another RF frequency such as f2 can be used. One BTS will provide the hardware required to operate two frequencies f1 and f2. Usually at the same time, the two existing antennas for each sector are used for f1 and f2.

Returning to FIG. 1, the DACS 20 is coupled with the BTSs 14, 16, 18 with signaling data links and trunk circuits 58, 59, 60 and is operable for routing and switching control messages between the BTSs and the other components in the wireless network. The BSC 22 is coupled with the DACS with signaling data links and trunk circuits 61 and is operable to control operation of the DACS and the BTSs 14, 16, 18. The BSC is basically a high-capacity switch that provides total overview and control of wireless functions supported by the network such as call handoff control, cell configuration management, and BTS and mobile phone power level management. The BSC multiplexes signals from the BTSs into transmission signals that are sent to the MSC 24. The BSC also routes network signals and calls from other components of the wireless network to the appropriate BTS for transmission to the mobile stations.

The MSC 24 is coupled with the BSC 22 and other base station controllers with signaling data links and trunk circuits 62 and is operable to coordinate the establishment of calls to and from the mobile stations 48–54 and to handle transmission facilities management, mobility management, and call processing. The MSC is also connected with the PSTN 12 by signaling data links and trunk circuits 64 to provide switching between the wireless network and the PSTN.

The MSC 24 either includes an integrated visitor location register (VLR) 66 or is coupled with a stand-alone VLR. The VLR includes a database that contains information relating to visiting mobile phones that are roaming outside of their home service area. When a mobile phone is roaming in a visiting service area, the local provider in the visiting service area queries the HLR 30 through the STP 26 using Signaling System #7 (SS7) or other signaling to retrieve information needed to verify the legitimacy of the mobile phone and to obtain a profile of the features associated with the mobile phone. The HLR responds to the query by transferring the necessary data to the VLR. This information is maintained in the VLR of the local provider as long as the roaming mobile phone remains active within that coverage area. The HLR also updates its own database to indicate the current location of the roaming mobile phone so that it can divert calls to the phone through the local provider in the visiting service area. The querying process in the preferred wireless network is accomplished via SS7 links using the STP and SCP as described below.

The STP 26 is connected between the MSC 24 and the WIN SCP 28 by signaling data links 68 and 70 and is operable to route signaling messages therebetween. STPs are well known in the art with an example being the DSC Megahub.

The WIN SCP 28, which is well known in the art, preferably uses TCAP protocols to perform transaction processing for wireless calls. However, other signaling systems or means to exchange messages are equally applicable to the present invention. The WIN SCP is coupled with the STP 26 to exchange signaling messages with the MSC 24 and other mobile switching centers. The WIN SCP may also include a plurality of databases for providing intelligence and certain enhanced services to the wireless network.

The HLR 30 may be a database residing on the WIN SCP 28 or may be a stand-alone database servicing several SCPs. In either case, the HLR includes a database containing subscriber data and information used to identify a subscriber of the wireless network and subscriber data relating to features and services available to the subscriber. The HLR, which represents the "home" database for subscribers, may, for example, contain a record for each home subscriber that includes location information, subscriber status, subscribed features, and directory numbers. The HLR is used in conjunction with the VLR 66 as described above to support mobility management features to which the user has subscribed when that user is roaming outside of his home area.

As is well known in the art, the MSC 24, STP 26, WIN SCP 28, HLR 30, and VLR 66 all communicate via out of band signaling, typically using SS7 or TCP/IP protocols to facilitate the routing of calls through the wireless network. The signaling allows the network elements to exchange information to more quickly and efficiently route calls over the network.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A CDMA telecommunications network comprising:
    a plurality of telecommunications cells, each cell including—
        a base station;
        a plurality of antennas coupled with the base station and oriented for subdividing the cell in a plurality of sectors, each sector having two of the antennas positioned therein;
        the base station being operable for controlling wireless communication in the cell using selected ones of a defined set of CDMA codes for each of the sectors, the base station being further configured for dividing the CDMA codes between the two antennas in each sector and operating one of the two antennas at a first frequency and operating the other of the two antennas at a second frequency; and
    a mobile switching center operable for routing calls through the base stations and including a visitor location register operable for containing information relating to visiting mobile phones that are roaming outside of their home service area.

2. The network as set forth in claim 1, the antennas being oriented for configuring the site into three corresponding sectors.

3. The network as set forth in claim 1, the first frequency including about 1931.25 MHZ.

4. The network as set forth in claim 1, the second frequency including about 1933.75 MHZ.

5. A method of operating a cell having an antenna site in a CDMA PCS telecommunications network, the method comprising the steps of:
    (a) transmitting and receiving CDMA telecommunications at the antenna site by way of a plurality of antennas configuring the site into a plurality of sectors, each of the sectors including two antennas;
    (b) using a single base station unit coupled with the antennas for controlling the transmitting and receiving over one of the two antennas in each sector over a first frequency using selected ones of a defined set of CDMA codes;

(c) using the base station for controlling the transmitting and receiving over the other of the two antennas in each sector over a second frequency using selected ones of the defined set of CDMA codes; and (d) using a visitor location register for containing information relating to visiting mobile phones that are roaming outside of their home service area.

6. The method as set forth in claim 5, step (b) including the step of using 1931.25 MHZ as the first frequency.

7. The method as set forth in claim 5, step (b) including the step of using 1933.75 MHZ as the second frequency.

8. The method as set forth in claim 5, step (a) including the step of using three antennas oriented for configuring the site into three sectors.

9. A CDMA telecommunications network comprising:

a plurality of telecommunications cells, each cell including— a single base station, antennas coupled with the base station and oriented for configuring the cell into three sectors, with each sector having two of the antennas, and the base station being operable for controlling transmission and reception of wireless communication in the cell by dividing a defined set of CDMA codes between each of the two antennas in each sector so that a first antenna in each sector transmits at a first frequency and a second antenna in each sector transmits at a second frequency;

a digital access and cross-connect system operable for routing control messages to and from the base stations;

a base station controller operable for controlling operation of the digital access and cross-connect system; and a mobile switching center operable for routing calls through the base stations and including— visitor location register operable for containing information relating to visiting mobile phones that are roaming outside of their home service area so that calls may be diverted to the visiting mobile phones in an appropriate one of the cells, wherein the information is maintained in the visitor location register as long as the visiting mobile phone remains active in the appropriate cell.

10. The network as set forth in claim 9, the first frequency including about 1931.25 MHZ.

11. The network as set forth in claim 9, the second frequency including about 1933.75 MHZ.

* * * * *